H. T. WHITTEKIN.
CLAMP FOR AUTOMOBILE SPRINGS.
APPLICATION FILED MAY 12, 1917.

1,236,522.

Patented Aug. 14, 1917.

Witness
Estelle Stockman

Inventor
Homer T. Whittekin
By Shepherd Campbell
Attorneys

UNITED STATES PATENT OFFICE.

HOMER T. WHITTEKIN, OF COALINGA, CALIFORNIA.

CLAMP FOR AUTOMOBILE-SPRINGS.

1,236,522.  Specification of Letters Patent.  Patented Aug. 14, 1917.

Application filed May 12, 1917. Serial No. 168,224.

*To all whom it may concern:*

Be it known that I, HOMER T. WHITTEKIN, a citizen of the United States of America, residing at Coalinga, in the county of Fresno and State of California, have invented certain new and useful Improvements in Clamps for Automobile-Springs, of which the following is a specification.

This invention relates to clamps for vehicle springs. In some types of springs the several leaves comprising the spring are secured to the frame of the vehicle by clips and suspension bolts. The strain upon these clips and bolts and particularly upon the latter is very great and it has frequently been the case that these bolts break and permit consequent damage to the frame hanger or the springs or other parts of the car.

It is primarily the object of the present invention to provide a combined clamp and support which will effectually reinforce and support the parts in such manner that breaking the bolt above mentioned will be effectually prevented.

Further objects and advantages of the invention will be set forth in the detailed description which now follows:

In the accompanying drawing.

Like numerals designate corresponding parts in both of the figures of the drawing.

Figure 1:
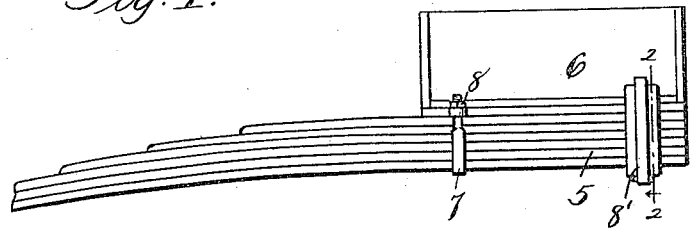
Figure 1 is a side view of a spring having the attachment applied thereto.
Figure 2:
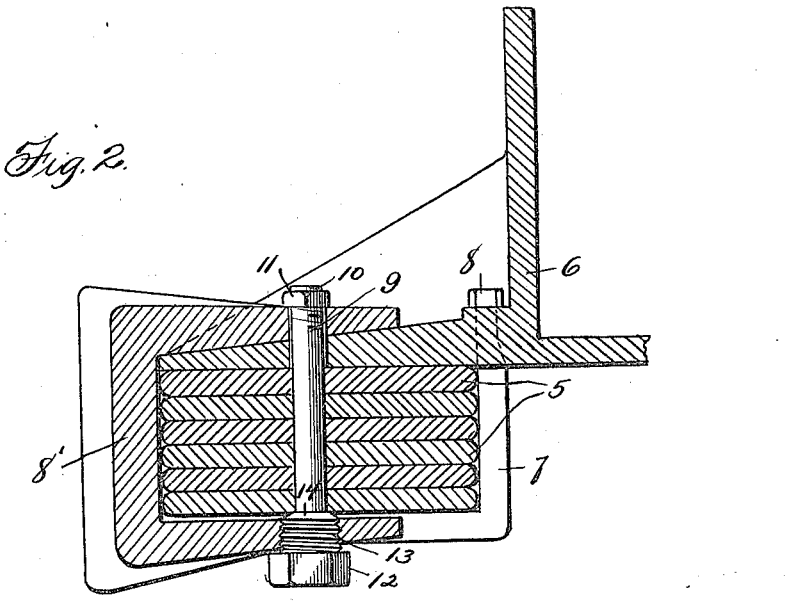
Fig. 2 is an enlarged, transverse, vertical section through the clamp and support and associated parts.

Referring to the drawing the numeral 5 designates the several leaves constituting vehicle springs and 6 a frame hanger. Heretofore it has been customary to support the leaves constituting the springs from the underside of the frame hanger by a clip 7 held by nuts 8 and by a suspension bolt adjacent the rear ends of the leaves, the suspension bolt not being shown in the accompanying drawing. These suspension bolts frequently break with great resultant damage to the vehicle to which the spring is applied and it is to prevent this that the present invention is particularly designed. In carrying out the invention I provide a U shaped clamp 8', the legs of which lie above and in contact with the upper face of the frame hanger 6 and below the under face of the lowermost leaf 5. In lieu of the suspension bolt hereinbefore mentioned I provide a bolt 9 having its upper end threaded at 10 for the reception of one or more lock nuts 11 and having its lower portion provided with an angular head 12 and an enlarged threaded portion 13 having a tapering upper surface 14. The portion 13 is threaded into the lower leg of the U shaped clamp 8'.

The provision of the lock nuts 11 provides a safe guard against accidental dislodgment of the bolt 9 but even if the lock nuts 11 were entirely dislodged the bolt 9 would not drop out of place because of the provision of the enlarged portion 13 which is threaded into the lower leg of the clamp 8'. Furthermore, the provision of the enlargement 13 renders it unnecessary to fit the clamp with great accuracy to the width of the springs because the enlarged portion 13 will through the face 14 act upon the leaves of the springs to clamp them tightly together even though the clamp might be slightly larger than the combined thickness of the frame hanger and the leaves of the spring.

Having described my invention what I claim is:—

1. The combination with a frame hanger of means for suspending a spring therefrom comprising a clamp adapted to embrace both the spring and the frame hanger and a bolt traversing the clamp and the spring and the frame hanger.

2. A device of the character described, comprising in combination a frame hanger, a spring, and means for suspending the spring from the frame hanger comprising a U shaped clamp, the legs of which embrace the spring and the frame hanger together with a bolt having an enlarged threaded portion for engagement with the lower leg of the clamp.

3. A structure as recited in claim 2 in which the upper end of the bolt is threaded and a lock nut for said threaded end.

In testimony whereof I affix my signature.

HOMER T. WHITTEKIN.

Witnesses:
 FRANK BERMAN,
 W. J. KILBY.

Copies of this patent may be obtained for five cents each, by addressing the "Commissioner of Patents, Washington, D. C."